United States Patent
Kemner et al.

[11] Patent Number: 5,488,287
[45] Date of Patent: Jan. 30, 1996

[54] METHOD OF PRODUCING ELECTRICAL ENERGY BY MEANS OF GENERATORS AND USE OF THE METHOD IN VEHICLES WITH ANTI-SKID SYSTEMS

[75] Inventors: Axel Kemner, Isernhagen; Mahmud Keschwari, Barsinghausen; Peter K. Zeller, Heubach, all of Germany

[73] Assignee: Mannesmann Aktiengesellschaft A corporation of Germany, Dusseldorf, Germany

[21] Appl. No.: 898,904

[22] Filed: Jun. 12, 1992

[30] Foreign Application Priority Data

Jun. 12, 1991 [DE] Germany ............... 41 19 834.4

[51] Int. Cl.⁶ ........................................... H02P 9/00
[52] U.S. Cl. ............................ 322/20; 322/26; 322/29
[58] Field of Search .................... 322/29, 30, 31

[56] References Cited

U.S. PATENT DOCUMENTS

| | | | |
|---|---|---|---|
| 3,662,252 | 5/1972 | Smith | 322/31 X |
| 3,666,039 | 5/1972 | Bachle et al. | 310/68 X |
| 4,164,872 | 8/1979 | Weigl | 73/510 |
| 4,377,975 | 3/1983 | Scott et al. | 105/96.1 |
| 4,457,237 | 7/1984 | Theurer et al. | 105/61 |
| 4,657,289 | 4/1987 | Boyer | 290/1 R |
| 5,244,171 | 9/1993 | Drake et al. | 246/168.1 |

FOREIGN PATENT DOCUMENTS 843866  5/1952  Germany.
2551009 10/1977 Germany.

*Primary Examiner*—Steven L. Stephan
*Assistant Examiner*—Nicholas Ponomarenko
*Attorney, Agent, or Firm*—Cohen, Pontani, Lieberman & Pavane

[57] ABSTRACT

A method of producing electrical energy from rotary motion of an axle of a vehicle utilizes a generator assembly including a generator coupled to the axle. The method includes determining the rate of rotation of the axle, carrying out the electrical energy production as well as the determination of the rate of rotation exclusively through the generator, and evaluating pulse parameters of each induced electrical voltage pattern for the determination of the rate of rotation. The generator assembly includes a rotor coupled to the axle and permanent magnets mounted on the rotor distributed over the circumference thereof. The permanent magnets have radially extending polar axes. A stator includes induction coils mounted coaxially around the circumference of the rotor. An air gap is defined between the stator and the rotor. The effective pole surface of the stator has an axial extension which is smaller than the axial extension of the pole surface of the rotor, so that a pole overlap ratio between the rotor and the stator is greater than 1 in any situation of operation. The arrangement also includes an electronic unit for evaluating the generator functions. The method and arrangement can be used in anti-skid systems of a plurality of coupled vehicles, particularly of vehicles traveling on rails, and in a drive slippage control system of a vehicle, particularly a vehicle which travels on rails.

7 Claims, 4 Drawing Sheets

METHOD OF PRODUCING ELECTRICAL ENERGY BY MEANS OF GENERATORS AND USE OF THE METHOD IN VEHICLES WITH ANTI-SKID SYSTEMS

BACKGROUND OF THE INVENTION

1. Field of the Invention

The present invention relates to a method of producing electrical energy from the rotary motion of the axles of vehicles, particularly of vehicles which travel on rails. The method utilizes a generator arrangement in which, in addition to producing electrical energy, the rate of rotation of the respective axle is determine.

The invention also relates to an axle generator arrangement, particularly for carrying out the above-described method. In particular, the arrangement includes a rotor which is coupled to the axle of the vehicle and is provided with permanent magnets which are arranged distributed over the circumference. The arrangement further includes a stator which is provided with induction coils and is spaced from the rotor through an air gap. The arrangement further has an electronic unit for evaluating the generator functions.

The invention further relates to the use of the above-described axle generator arrangement in the above-described method.

2. Description of the Related Art

German patent 25 51 000 discloses an alternating current generator to be mounted in an axle-bearing cover of a railroad car. It is known from this patent to mount within the alternating current generator a digital angle-of-rotation pick-up which is capable of determining the rate of rotation of the axle of the railroad car connected to the rotor of the generator. This known arrangement has the disadvantage that an additional rate-of-rotation pick-up is required for determining the rate of rotation of the axle. This arrangement increases the structural requirements in manufacturing such a generator. In addition, the additional pick-up requires maintenance. The rotor of this known alternating current generator is rigidly connected to the axle of the vehicle and is provided with permanent magnets whose flux lines emerge in the direction of the stator in axial direction. Consequently, located axially opposite the rotor is a stator with an appropriate arrangement of induction coils and ferrite cores. The axially oppositely located stator and rotor are spaced apart from each other by a defined air gap. As a result, the electrical energy which is generated depends in any situation of operation on the size of the air gap between rotor and stator and, thus, from the axial position of the vehicle axle. Since axial displacements of the axle certainly occur during operation, for example, when the vehicle travels through curves at high speed, the resulting changes in the air gap inevitably have a disadvantageous influence on the continuity and the constancy of the energy production. It is apparent that such an axial displacement is even inevitable because of the fact that the rotor must be coupled to the axle and rotates together with the axle and that the stator must be kept stationary, which is achieved, for example, by a rigid connection with the axle bearing support.

In the known generator, the disadvantageous effect of axial displacements of the axle are due to the fact that displacements in the range of millimeters already create a significant change of the air gap and, thus, of the electrical energy which is generated. When the electrical energy is used in sensitive measuring systems or control systems within the railroad vehicle, the resulting voltage fluctuations of the electrical energy are a disadvantage because an essentially voltage-constant electrical energy source must be available for an operationally safe supply of such a controlled arrangement. As a rule, an accumulator is provided as a "buffer" between the energy source or the "producer" and the "user." However, permanent fluctuations of the electrical voltage are also a disadvantage in this situation. In the event that the energy supply of important elements must be ensured during the travel operation for safety reasons when the accumulator fails or breaks down, an electrical energy source with substantial voltage fluctuation constitutes a great disadvantage, and even a dangerous disadvantage. Since different voltage values result in dependence on the speed, while the voltage must be maintained constant through an electronic unit, the compensation of the above-described additional voltage fluctuation would require an additional electronic unit.

The arrangement of a separate digital rate-of-rotation pick-up within the generator as described above with respect to the state of the art causes the functions of energy production and rate-of-rotation pick-up to be uncoupled and makes the system more susceptible to trouble.

SUMMARY OF THE INVENTION

Therefore, it is the primary object of the present invention to provide a method of operating an axle generator arrangement, an axle generator arrangement for carrying out the method, and a method of using the axle generator arrangement in which a separate rate-of-rotation pick-up is not required and in which a safe and reliable energy supply is ensured in all situations of operation, while the electrical voltage remains as constant as possible.

In accordance with the present invention, in the above-described method, the electrical energy production, as well as the determination of the rate of rotation, take place exclusively through the generator function, wherein the pulse parameters of each induced voltage pattern are evaluated for determining the rate of rotation.

In the above-described axle generator arrangement for vehicles, particularly vehicles which travel on rails, including a rotor which is coupled to the axle of the vehicle and has permanent magnets arranged distributed over the circumference and a stator provided with induction coils and an electronic unit for evaluating the generator function, the above-described object is met in accordance with the present invention by arranging in the assembled state of the arrangement the stator coaxially around the outer circumference of the rotor, and by constructing the magnetic guide body of the stator assembly, relative to its effective pole surface in the axial extension thereof, smaller than the axial extension of the pole surface of the rotor assembly, such that the pole overlap ratio between rotor assembly and stator assembly is greater than 1 in any situation of operation. In addition, permanent magnets which extend radially with respect to the pole axes thereof are arranged within the magnetic guide body.

Furthermore, in accordance with the present invention, the axle generator arrangement is used in an anti-skid system in vehicles, particularly in vehicles which travel on rails, in which the energy supplied to each anti-skid system is independent from one vehicle to the next coupled vehicle, particularly of a railroad train, and in which the respectively determined information with respect to the rate of rotation is fed as an input value into the control circuit of the anti-skid system.

The present invention further proposes that the above-described method and axle generator arrangement is used in a drive slippage control in vehicles, particularly in vehicles which travel on rails, in which the respectively determined information with respect to the rate of rotation is fed in as the input value for carrying out the drive slippage control.

The method according to the present invention provides the advantage that a separate rate-of-rotation pick-up is not required because of the direct determination of the rate of rotation from the pulse parameters of each induction voltage pattern. As a result, the method is simplified, and the safety of operation is additionally increased. The pulse width determination of the induction voltage patterns which is also proposed in accordance with the present invention is advantageously used for the determination of the rate of rotation as well as for controlling the function of the generator and the windings thereof. It is an advantage that the speed of the vehicle can be determined simultaneously from the measured pulse widths and, thus, in a very simple manner. Although the determination of the speed is known from the above-mentioned state of the art, the state of the art utilizes a separate rate-of-rotation pick-up which is not required in accordance with the present invention. The method according to the present invention provides another possibility because of the fact that the speed of the vehicle can also be determined from the pulse depth and from the rate of rotation of the induced voltage pattern.

The features proposed in accordance with the present invention in an axle generator arrangement result in a number of advantages.

The axle generator constructed in order to carry out the method of the present invention provides the advantage that the pole overlap ratio ensures a higher continuity and constancy of the generated voltage. This pole overlap is constructed in such a way that the axial extension of the rotor assembly overlaps the axial extension of the stator assembly. In addition, the arrangement of the stator assembly relative to the rotor assembly is selected in such a way that the stator assembly is completely covered by the rotor assembly in any practically possible axial displacement of the axle. Together with the above-described pole overlap, the fact that the stator is arranged concentrically around the rotor in the state of operation has the result that the induction in the resulting air gap between rotor and stator remains independent of axial displacements. Thus, contrary to the above-described state of the art, an axial displacement of the vehicle axle or of the rotor connected to the vehicle axle does not result in a change of the air gap and, therefore, completely eliminates in an advantageous manner any voltage fluctuations caused by axial displacements.

In accordance with another feature of the present invention, the permanent magnets of the rotor are supported by a shrunk-on ring of a non-magnetic material which simultaneously acts as a reluctance ring. This arrangement of a shrunk-on ring of a non-magnetic, but electrically conductive, material provides the advantage that this ring acts as a reluctant damping cage. This means that, even in the case of displacements in the axial and radial direction, this displacement causes changes in the air gap in certain sections, however, the changes in the air gap do not result in voltage fluctuations because the damping cage electrically compensates the air gap changes.

The non-magnetic shrunk-on ring acting as a reluctant damping cage has the additional mechanical function of securing the permanent magnets against radial displacement during the rotation of the rotor. However, the shrunk-on ring has the additional extremely important electrical function of compensating the voltage fluctuations or harmonic oscillations or peak voltages during a possible electrical load change of the generator. A load change is intended to mean that, for example, a user is suddenly connected to the electrical generator output which would produce an induction peak. However, the shrunk-on ring compensates this induction peak. This compensation is carried out by producing a current in the shrunk-on ring because of a magnetic flux change in the air gap, wherein the current in the shrunk-on ring produces an opposing field and thus, in sum, maintains constant the air gap induction even in the case of an electrical load change. As a result, peak voltages and the like are avoided, which is particularly important for protecting the electronic unit for evaluating the rate of rotation.

The dimensions of the magnetic circuit, i.e., the geometric configuration of the stator in relation to the rotor relative to the poles and the intended pole overlap ratio, are advantageously adjusted in such a way that the generator reaches a saturation with respect to its generator output current, even at very low rates of rotation, wherein the saturation essentially remains constant, even when the rate of rotation is significantly increased. This is achieved in a simple manner by selecting the dimensions in such a way that the magnetic saturation of the entire magnetic circuit is reached very early, i.e., already at low rates of rotation. This earliest possible saturation is intended to result in an intentional reduction of the efficiency of the generator. This ensures that, at the output of the generator, it is possible in a simple advantageous manner to connect an electronic evaluation unit for determining the rate of rotation because the output is very stable. Because of the generator output current, which is maintained as constant as possible, the generator is extremely resistant against short circuits and ensures that the electronic unit required for determining the rate of rotation can be connected in an extremely operationally safe manner. As a result, it is possible to ensure that the rate of rotation is determined directly from the induction voltage pattern without endangering the electronic unit for determining the rate of rotation.

In connection with the method according to the present invention, constructing the axle generator as a three-phase generator provides the advantage that each winding independently generates an induction voltage pattern and, thus, because of the spatial distribution of the windings or of the induction coils, a high resolution with respect to location of the rate of rotation determined from the pulse width is possible.

The method of operation of the axle generator arrangement, as well as the structural features of the axle generator, make it possible that an output voltage can be delivered which is reliable, operationally safe, and maintained continuously at a constant level. The use of the axle generator arrangement in accordance with the method of the present invention results in a number of advantages with respect to elements which determine a sensitive and safe operation of the vehicle. Accordingly, the use of the method and of the axle generator arrangement operated in accordance with the method in an anti-skid system in vehicles, particularly vehicles which travel on rails, in which the energy supply to each anti-skid system from one vehicle to the next coupled vehicle is electrically independent, ensures high safety in an advantageous manner. This can be achieved particularly in high-speed trains. When used in accordance with the present invention, the advantages of the method are particularly apparent because the respectively determined rate of rotation is fed in an advantageous manner as an input value into the control circuit of the anti-skid system.

Since the method according to the present invention provides the advantage that the energy supply and the determination of the rate of rotation take place in the generator itself and, thus, in addition to the determination of the rate of rotation, the control of the function of the generator itself can be carried out, the use of the present invention, particularly in an anti-skid system, ensures an extremely high safety level of the entire operation of a railroad train.

The advantage of the simultaneous secure energy production and the determination of the rate of rotation directly from the induction voltage pattern can also be utilized with the assurance of high operational safety in a drive slippage control system in vehicles, particularly vehicles which travel on rails. In this situation, the advantage is due to the fact that, when the axle generator arrangement proposed in accordance with the present invention is used in the method of the invention for determining the rate of rotation, a high resolution with respect to location of the position of rotation of the vehicle axle is obtained. This determination of the rate of rotation with a high resolution with respect to location and a quick resolution with respect to rate of rotation causes the drive slippage control system to be appropriately sensitive. This sensitivity provides the basis for an extremely advantageous possibility of combining method, axle generator arrangement, and use thereof in accordance with the present invention. Accordingly, it is possible to meet the high requirements with respect to safety in high-speed trains by using technically simple but extremely reliable means.

The arrangement according to the present invention is particularly advantageous when used in high-speed freight cars. This is because such freight cars are subject to the same safety regulations as are passenger train cars. This means that a deceleration from high speeds must be ensured within a 1,000 meter zone. The independent energy supply of each individual car and, thus, the possibility of the direct control of the brake system of each car make it possible that the brake signal released by the engine simultaneously initiates the braking procedure independently of the length of the train without delay from one car to the next car. Accordingly, delays caused, for example, by delays in the flow of pressure medium from one car to the next are completely eliminated. For controlling the brake pressure and optimizing the braking distance, an anti-skid system or anti-blocking system is used which determines the optimum brake pressure in dependence on the traction value between wheel and rail and which conveys this optimum brake pressure to the pressure medium and the brake being controlled.

It is important in this connection that, when using the method according to the present invention and the axle generator for carrying out the method, the determined frequency of the generated voltage serves as the input value for the anti-skid system or anti-blocking system. This makes it unnecessary to monitor the rate of rotation of the axles by means of separate rate-of-rotation pick-ups because the rate of rotation is determined, for example, from the measured pulse width of the generated voltage.

When the method and the axle generator according to the present invention are used in connection with a drive slippage control, for example, in train engines, it is also an advantage that the rate of rotation of the respective axle can be determined in the manner already described above. If such a system is mounted in a train engine, it would even be possible not to provide a tacho-generator because the determination of the speed can be derived from the measured pulse parameters.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there is illustrated and described a preferred embodiment of the invention.

DESCRIPTION OF THE PREFERRED EMBODIMENT

Figure 1:
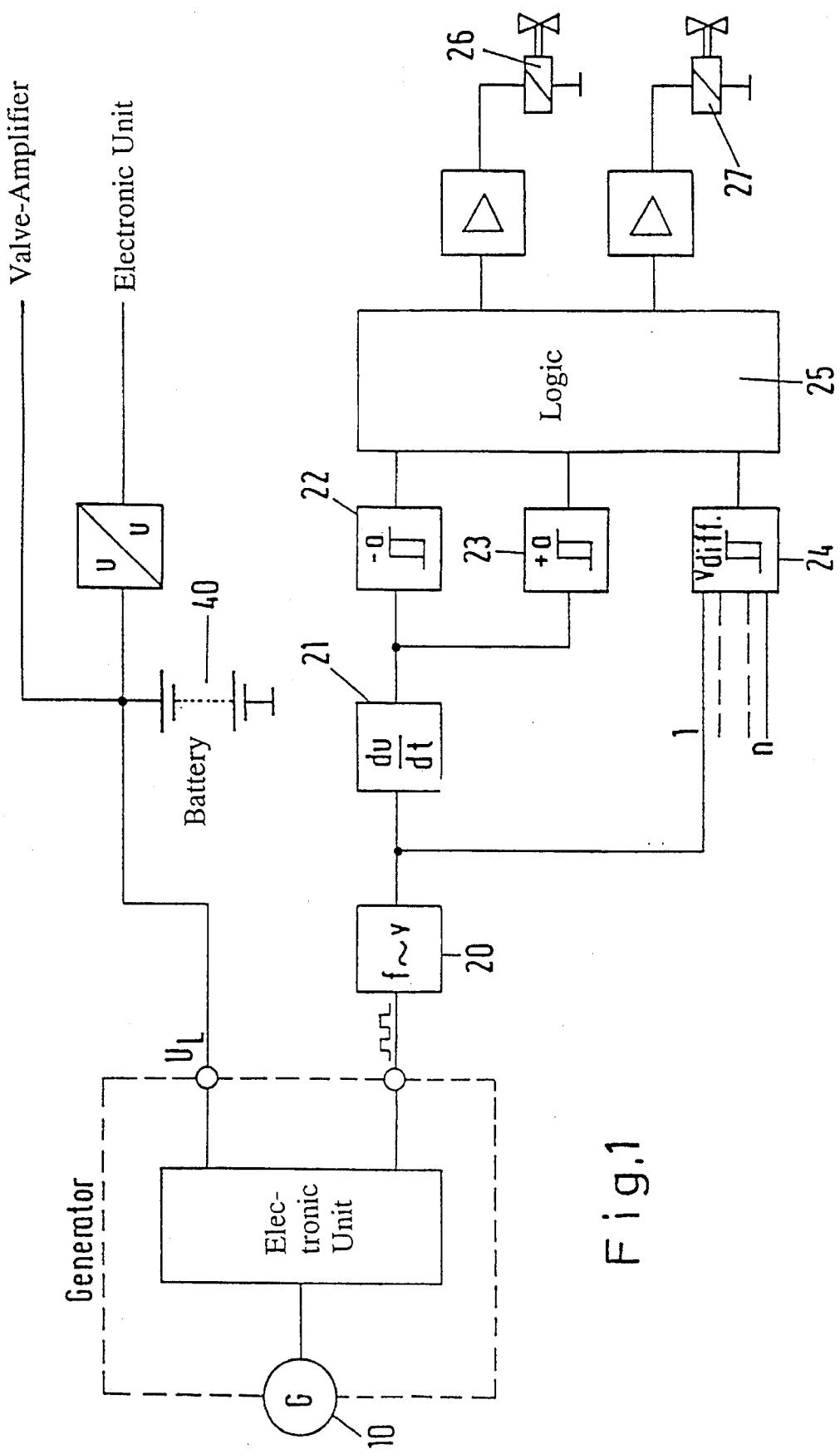
FIG. 1 is a block diagram illustrating the manner of operation of the generator and the determination of the rate of rotation.

The block diagram of FIG. 1 of the drawing illustrates the manner of operation of the method proposed in accordance with the present invention and of the axle generator 10 operating in accordance with this method as follows.

The voltage generated by generator 10 is supplied to an electronic unit which determines the appropriate parameters in accordance with the method and additionally supplies an output voltage which is controlled at constant. The electronic unit further supplies a digital pulse width signal at an additional separate output. The pulse width signal which, for example, is prepared as a rectangular signal, is supplied to an electronic unit 20 for determining the speed of the appropriate axle which supplies the determined speed at the output thereof.

The speed which has been determined or computed is supplied, on the one hand, to a speed comparator 24 as the actual value. The speed comparator 24, in turn, inquires as to the desired value at the second input. This means that a determination is being made whether the circumferential speed of the wheel coincides with the real speed. In other words, it is being determined whether the wheel rotates with traction, i.e., without difference in speed, or whether the wheel rotates with sliding friction with the corresponding speed difference. The determined speed difference is supplied to a logical unit 25 which carries out measures for initiating the braking procedure and, thus, the control of valves 26, 27 which effect the braking procedure. Simultaneously, the acceleration is computed from the actual speed value by an electronically realized mathematical first derivative and the acceleration is supplied parallel to two comparators 22, 23 which decide whether a positive acceleration or negative acceleration takes place; in other words, the comparators 22, 23 decide whether there is an acceleration or a braking procedure. Depending on whether there is deceleration or acceleration, the appropriate output is connected to the logical unit 25 in which a decision is made as to the braking effect to be obtained and the decision is supplied at the output to an amplifier for producing the signals required for the electrically controlled valves 26, 27. In summary, this means that a parallel evaluation of the anti-skid system or anti-blocking system and of the drive slippage control is possible from the speed observation and the acceleration observation. It would also be conceivable to feed the anti-blocking system, as well as the drive slippage control, from the observation of the acceleration conditions alone, however, the speed observation is interesting for the drive slippage control when the drive wheels spin at a high rate of rotation. In this state of operation, a reference speed is formed within the engine, either as an imaginary value or through an additional axle, so that an evaluation of the speed difference is more advantageous.

When the arrangement is used in a drive slippage control system, the individual elements interact in a similar manner. Initially, the pulse width of the generated electrical voltage which is proportional to the rate of rotation is measured and the speed is determined therefrom. Subsequently, the deceleration or acceleration of the driven sets of wheels is computed and a comparison of the speed differences within different sets of wheels is carried out. By carrying out the evaluation of the speed differences of different sets of wheels of a car, it is even possible to determine oscillations of the set of wheels which may be due, for example, to asymmetrical drive forces and, thus, to torsion. Consequently, it is also possible in an advantageous manner to influence the control of the rate of rotation of the engine through which, in turn, it is possible to compensate the oscillations of the set of wheels.

The logical unit 25 is provided with two outputs which, on the one hand, effect through an amplifier the ventilation of the valve 26 which controls the brake and, on the other hand, effect through another amplifier the supply of the valve 27 which locks the work pressure. If carried out in the appropriate coordinated sequence, this has the result, for example, in a braking procedure, that pressure medium is supplied through opening of the work pressure valve 27 and the brake is actuated, and that during a short release, for example, when the anti-blocking system is actuated, the brake must be released by ventilating the pressure medium line controlled by valve 26 and by closing the work pressure valve 27.

Figure 2:
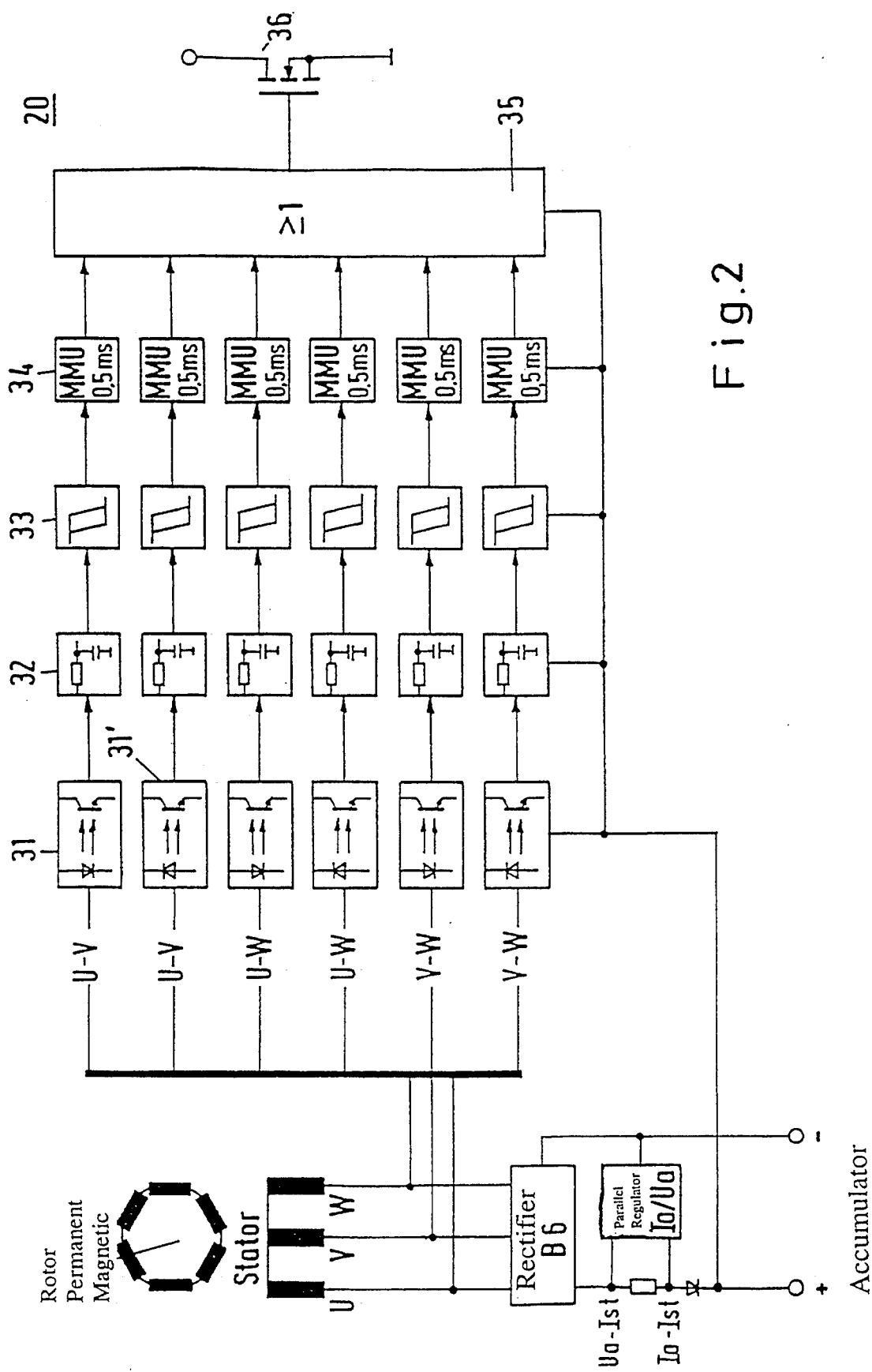
FIG. 2 is a block diagram illustrating the determination of the induced voltage pattern for the rate of rotation.

The determination of the pulse parameters from the induced voltage pattern of the induction coils of the axle generator is illustrated in FIG. 2 of the drawing. Before being supplied to a rectifier, the direct three-phase output of the stator is taken up in parallel and is supplied to an arrangement of optical couplers 31, 31' . . . The output phases are denoted by U, V, and W. The optical couplers are arranged in such a way that two optical couplers 31, 31' are always arranged between two phases, wherein one of the optical couplers handles the upper half-wave and the other of the optical couplers handles the lower half-wave of the induced voltage pattern. Each of the half-waves having a respective pulse parameter. Accordingly, in this three-phase arrangement there are altogether six pulse width signals which are appropriately offset with respect to time. These signals are each supplied through an RC-section 32 . . . to a Schmitt trigger 33 . . . which at the output side thereof controls a monostable multivibrator 34 . . . Each of the six pulse width signals is finally combined in a logical unit and is coordinated and evaluated with respect to time. The use of optical couplers not only results in a galvanic separation between the output phases U, V, W and the electronic unit for determining the rate of rotation, but the pulse width signals are formed essentially from the induction voltage pattern. The arrangement of the RC-section, of the Schmitt trigger and finally of the monostable multivibrator has the result that spurious signals are kept away from the logical evaluating unit 35 for the rate of rotation. To each monostable multivibrator 34 is assigned a time constant of 0.5 mm/sec.; this means that spurious signals with a time constant of less than 0.5 mm/sec. are not accepted as pulse width signals, but are considered spurious signals which have no influence on the determination of the rate of rotation. This time constant of 0.5 mm/sec. can be changed in accordance with each situation, so that this selected time constant is just smaller than the time constant of the detected pulse width signal. Since each pulse, due to its time-delayed sequence relative to the next pulse, resolves with respect to location the information of the final rotor/stator position, a sensitive resolution with respect to location of the rate of rotation is provided. In other words, an evaluation of the rate of rotation is already possible after a sixth of a revolution of the wheel. Accordingly, it is not necessary to wait until a full revolution of the wheel has occurred until the rate of rotation or speed can be evaluated. This is of particular significance when used in an anti-blocking system or a drive slippage control. FIG. 2 also shows the parallel further conveyance of the three-phase alternating voltage to a rectifier B6. A parallel control unit is arranged at the output. The parallel control unit, in turn, maintains constant the entire electrical output of the generator which is relevant for the energy supply. Connected thereto are the connections for the individual users or in parallel to the accumulator 40.

Figure 3:
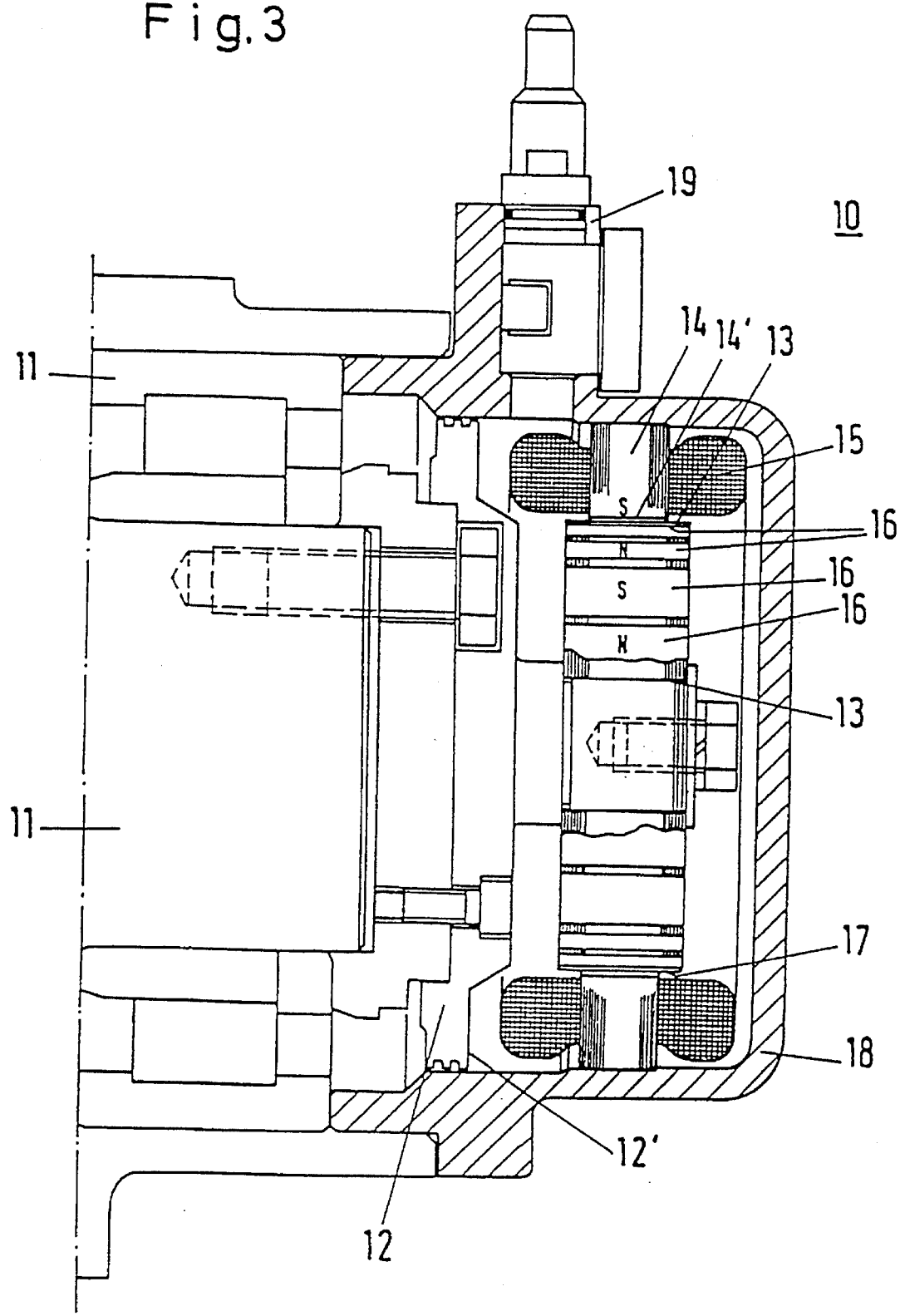
FIG. 3 is a sectional view of an axle generator according to the present invention.

FIG. 3 of the drawing is a sectional view showing the axle generator arrangement proposed in accordance with the present invention. The rotor 13 is connected directly to the axle 11 of the vehicle through a flange 12. The stator 14 is arranged within the axle cover 18, which also serves as a generator housing. The stator 14 is mounted in such a way that, during the assembly, after the rotor 13 has been fastened to the axle 11, the stator 14 can be slid onto the rotor 13 with an air gap remaining therebetween. The cover 18 of the axle generator 10 closes off the entire arrangement in the manner of a housing. The housing itself may be fastened, for example, to the axle bearing support housing 11'. Accordingly, the air gap between rotor 13 and stator 14 is oriented radially between rotor and stator, which is contrary to the above-described state of the art in which the air gap is oriented in axial direction.

The axial extension of the poles or pole surfaces 13' of the rotor 13 is greater than the axial extension of the pole surface 14' of the stator set 14; in other words, the pole overlap ratio between rotor and stator is greater than 1. Accordingly, it is apparent that, even when the rotor 13 is axially displaced, the pole surface 14' of the stator 14 is still entirely covered by the pole surface 13' of the rotor 13. The dimensions of the stator 14 determine the effect of the early magnetic saturation. The dimensions of the stator set depend on the desired magnetic saturation and can be computed by using the usual formal relationships. The pole surface 13' of the rotor 13 is overdimensioned, so that the above-described effect of the axial displacement remains without influence on the air gap induction. In this situation, the computation of the magnetic saturation of the stator set 14 is to be selected in such a way that a saturation of the current is already achieved at the desired speed. The stator set 14 and the rotor set 13 are laminated, i.e. , they are composed of stacks of sheets for reducing the eddy current losses. The induction coils 15 of the stator 14 are to be arranged accordingly in the illustrated manner. The permanent magnets 16 of the rotor 13 are radially magnetized relative to the pole axes thereof, i.e., the flux lines emerge radially. The permanent magnets 16 are arranged relative to each other in such a way that the magnetic polarities emerging at the circumference are reversed from one magnet to the next magnet.

The rectifier 19 for rectifying the alternating voltage is arranged integrated within the generator housing or cover 18, so that the entire electric output of the generator 10 is arranged completely at the generator itself. The output of the generator 10 is connected, for example, directly to a charge regulator 41 for feeding the accumulators 40 and supplying the device for determining the rate of rotation.

In the axle generator according to the present invention, the flange 12 connected to the rotor 13 and to be mounted on the axle 11 extends to the inner wall of the generator cover 18. The stationary generator cover is constructed so as to be round on the inside thereof. The outer circumference of the flange 12 which contacts the cover is provided with a labyrinth-type seal 12'. The labyrinth-type seal 12' is provided with a toothed surface as illustrated in FIG. 3 of the drawing. This labyrinth-type seal 12' may be integrally connected to the flange 12 by providing several parallel grooves on the circumference of the flange. However, it is also possible to provide the flange 12 with a separate labyrinth-type seal 12'. The labyrinth-type seal prevents bearing grease from penetrating into the generator space and, thus, hermetically seals the generator space.

Figure 4:
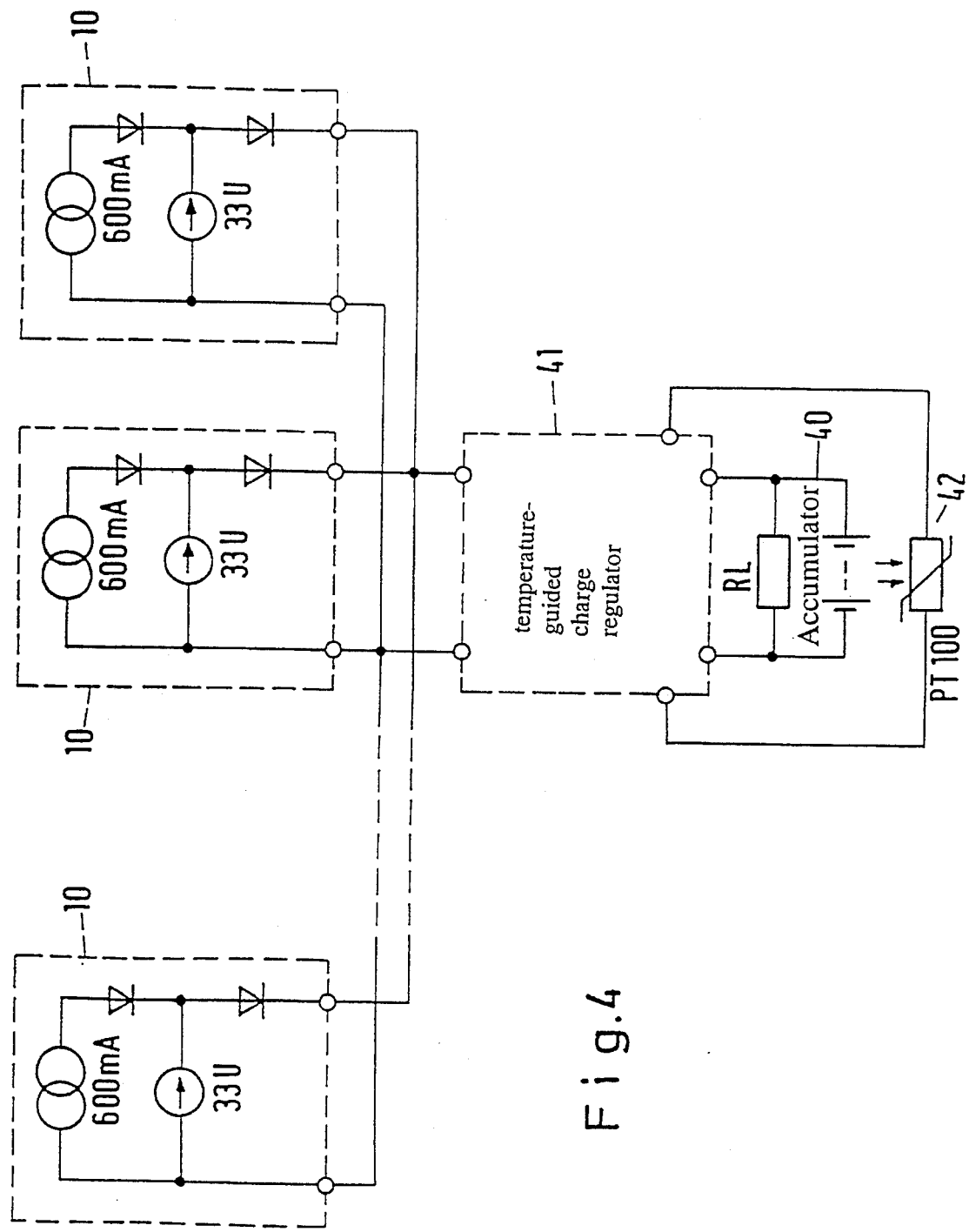
FIG. 4 is a block diagram illustrating a parallel connection of several axle generators during charging operation.

FIG. 4 of the drawing shows a multiple arrangement of generators which are connected in parallel. The capability of connecting the generators in parallel is particularly made possible by the configuration of the axle generator according to the present invention in which, in the manner described above, an output is provided which is controlled so as to be extremely constant with respect to the current. Since the voltage is also maintained essentially constant, the axle generator according to the present invention is highly suitable for the parallel connection. The combined output switches which are connected in parallel, are joined at a temperature-guided charge regulator which monitors and controls the charging operation of the accumulator. The temperature is monitored by means of a temperature-dependent resistor which is connected to the accumulator mechanically and in a manner which conducts heat.

The method proposed in accordance with the present invention, as well as the axle generator arrangement and the use of the method, provide an excellent solution for the above-described object because of the features thereof which are adapted to each other in an optimum manner. A separate rate-of-rotation pick-up is not required, so that the system is simplified. The configuration of the axle generator makes it possible to provide electrical energy in such a way that an anti-blocking system and/or drive slippage control system can be used in an extremely operationally safe manner. Together with the spatial arrangement of the coils and the six-pulse evaluation of the induction voltage patterns, the feature of the method of the present invention according to which the rate of rotation is determined directly from the generator function through the pulse width evaluation results in a high resolution with respect to location and, thus, in an extremely sensitive determination of the rate of rotation which are of vital importance in anti-blocking systems and drive slippage control systems.

The evaluation of the pulse parameters for determining the rate of rotation in accordance with the method of the present invention and the proposed consideration of the pulse width as the pulse parameter in the discussed embodiment are advantageous for the reasons and technical explanations already provided above. However, it is also possible to determine the rate of rotation from different pulse parameters; for example, the pulse depth, pulse spacing, pulse shape, etc., can be used. Since, depending on the type of winding of the induction coils of the stator, a generator can deliver rectangular or triangular voltage patterns in addition to, for example, a sine-shaped induction voltage, in some cases it may be more advantageous to use the pulse depth or pulse spacing rather than the evaluation of the pulse width for determining the rate of rotation. Accordingly, the method provides additional application possibilities. In addition, because of the fact that the method, the axle generator, and the use of the method are clearly defined, they can be used also in other types of vehicles, for example, in trucks with several trailers.

It should be understood that the preferred embodiments and examples described are for illustrative purposes only and are not to be construed as limiting the scope of the present invention which is properly delineated only in the appended claims.

We claim:

1. A method of producing electrical energy from rotary motion of an axle of a vehicle, by means of a generator assembly including a generator coupled to the axle, comprising determining the rate of rotation of the axle, carrying out the electrical energy production by the generator producing an induced electrical voltage pattern having upper and lower half-waves, each of which having a respective pulse parameter, carrying out the determination of the rate of rotation exclusively from the generator by evaluating the pulse parameters of the upper and lower half-waves of the induced electrical voltage pattern.

2. The method according to claim 1, comprising inducing a three-phase alternating voltage, and evaluating pulse widths from induction voltage patterns of each phase for the determination of the rate of rotation.

3. The method according to claim 1, comprising the step of controlling the operation of the generator by utilizing the determination of the rate of rotation.

4. The method according to claim 2, comprising determining a travel speed of the vehicle from the measured pulse widths of the induced voltage pattern.

5. A method of operating anti-skid systems of a plurality of coupled vehicles, comprising producing electrical energy from rotary motion of an axle of each vehicle by means of a generator assembly including a generator coupled to the axle, further comprising determining the rate of the rotation of the axle, carrying out the electrical energy production by the generator producing an induced electrical voltage pattern having upper and lower half-waves with respective pulse parameters, carrying out the determination of the rate of rotation exclusively from the generator by evaluating the pulse parameters of the upper and lower half-waves of the induced electrical voltage pattern, wherein each anti-skid system is electrically independent, and feeding the determined rate of rotation as an input valve into a control circuit of each anti-skid system.

6. A method of operating a drive slippage control system in a vehicle, comprising producing electrical energy from rotary motion of an axle of the vehicle by means of a generator assembly, including a generator coupled to the axle, further comprising determining the rate of rotation of the axle, carrying out the electrical energy production by the generator producing an induced electrical voltage pattern having upper and lower half-waves with respective pulse parameters, carrying out the determination of the rate of rotation exclusively from the generator by evaluating the pulse parameters of the upper and lower half-waves of the induced electrical voltage pattern, and feeding the determined rate of rotation as an input value into a control circuit of the drive slippage control system.

7. Process for the production of electrical energy from the rotational movement of an axle of a vehicle, particularly vehicles on rails, via generators which produce electric energy in a form from which the rate of rotation of the axle is determined, characterized in that the rate of rotation is determined only from an induced electrical alternating voltage pattern produced by the generator, the induced electrical alternating voltage pattern having upper and lower halve waves each of which has a respective pulse parameter, the rate of rotation being determined by keeping constant a magnetic saturation and concomitant output voltage of the generator, the determination of the rate of rotation being made from at least one of the pulse parameters of the upper as well as the lower half waves of the induced electrical alternating voltage pattern.

* * * * *